(12) United States Patent
Brun et al.

(10) Patent No.: US 12,147,090 B2
(45) Date of Patent: Nov. 19, 2024

(54) SELF-LOCKING EYEGLASS SYSTEM

(71) Applicant: LINDBERG A/S, Åbyhøj (DK)

(72) Inventors: Mathias Sommer Brun, Aarhus (DK); Henrik Lindberg, Risskov (DK); Lars Bøjvad, Højbjerg (DK); Hans Boye-Nielsen, Hinnerup (DK)

(73) Assignee: Lindberg A/S, Åbyhøj (DK)

( * ) Notice: Subject to any disclaimer, the term of this patent is extended or adjusted under 35 U.S.C. 154(b) by 692 days.

(21) Appl. No.: 17/398,439

(22) Filed: Aug. 10, 2021

(65) Prior Publication Data

US 2021/0364819 A1    Nov. 25, 2021

Related U.S. Application Data

(63) Continuation of application No. PCT/DK2020/050033, filed on Feb. 10, 2020.

(30) Foreign Application Priority Data

Feb. 11, 2019 (DK) .......................... PA 2019 70097

(51) Int. Cl.
*G02C 1/06* (2006.01)
*G02C 5/10* (2006.01)

(52) U.S. Cl.
CPC ........ *G02C 1/06* (2013.01); *G02C 5/10* (2013.01)

(58) Field of Classification Search
CPC ... G02C 1/06; G02C 1/10; G02C 5/10; G02C 5/00; G02C 5/02; G02C 5/45; G02C 5/06;

(Continued)

(56) References Cited

U.S. PATENT DOCUMENTS

| 2,703,036 A | 3/1955 | Splaine |
| 7,748,842 B2 | 7/2010 | Sakai |

(Continued)

FOREIGN PATENT DOCUMENTS

| CN | 2233094 Y | 8/1996 |
| CN | 201015012 Y | 1/2008 |

(Continued)

OTHER PUBLICATIONS

Official Action with Search Report from corresponding Chinese Patent Application No. 202080014162.4 dated Jan. 9, 2023.

(Continued)

*Primary Examiner* — Stephone B Allen
*Assistant Examiner* — Leonidas Boutsikaris
(74) *Attorney, Agent, or Firm* — Elmore Patent Law Group, P.C.; Joseph C. Zucchero

(57) ABSTRACT

Self-locking eyeglass system, comprising at least one locking element and at least one frame element, wherein the frame element additionally comprises a connection element, which is intended for connecting with a locking element, and wherein the frame element is non-interrupted in its external circumference, and wherein the connection element is provided on the inner side, wherein the self-locking eyeglass system additionally comprises two hinge elements, which each comprises an adapter element, which matches a recess in the frame element, wherein each hinge element has a connection element, which coincides with the frame element's connection element, when the hinge elements are mounted in the at least one frame element's recess, and wherein each hinge element is secured to the at least one frame element by a locking element, whereby a convenient, flexible and uncomplicated way to assemble, separate, replace and service a self-locking eyeglass system is achieved.

18 Claims, 24 Drawing Sheets

(58) Field of Classification Search
CPC ... G02C 7/00; G02C 2200/06; G02C 2200/08
USPC .................................. 359/105; 351/105, 83
See application file for complete search history.

(56) References Cited

U.S. PATENT DOCUMENTS

| | | | |
|---|---|---|---|
| 2005/0036101 | A1 | 2/2005 | Actis-datta |
| 2006/0279692 | A1 | 12/2006 | Bruck |
| 2017/0343834 | A1* | 11/2017 | Chen .................. G02C 5/10 |
| 2018/0136485 | A1* | 5/2018 | Linossier ............... G02C 5/146 |
| 2019/0219838 | A1* | 7/2019 | Padrin .................... G02C 1/10 |

FOREIGN PATENT DOCUMENTS

| | | |
|---|---|---|
| CN | 202548451 U | 11/2012 |
| CN | 205229579 U | 5/2016 |
| CN | 207557594 U | 6/2018 |
| DE | 1912030 A1 | 10/1969 |
| EP | 1326125 A2 | 7/2003 |
| EP | 3081981 A1 | 10/2016 |
| FR | 2842307 A1 | 1/2004 |
| FR | 3053130 A1 | 12/2017 |
| FR | 3082632 A1 | 12/2019 |
| JP | 2006221130 A | 8/2006 |
| JP | 4944087 B2 | 3/2012 |
| KR | 20130057644 A | 6/2013 |
| KR | 20160108990 A | 9/2016 |
| WO | 9723803 A1 | 7/1997 |
| WO | 2016113773 A1 | 7/2016 |
| WO | 2018007899 A1 | 1/2018 |
| WO | 2018167279 A1 | 9/2018 |

OTHER PUBLICATIONS

Translation of Office Action Search Report from corresponding Japanese Patent Application No. 2021-569586 dated Aug. 31, 2023.

* cited by examiner

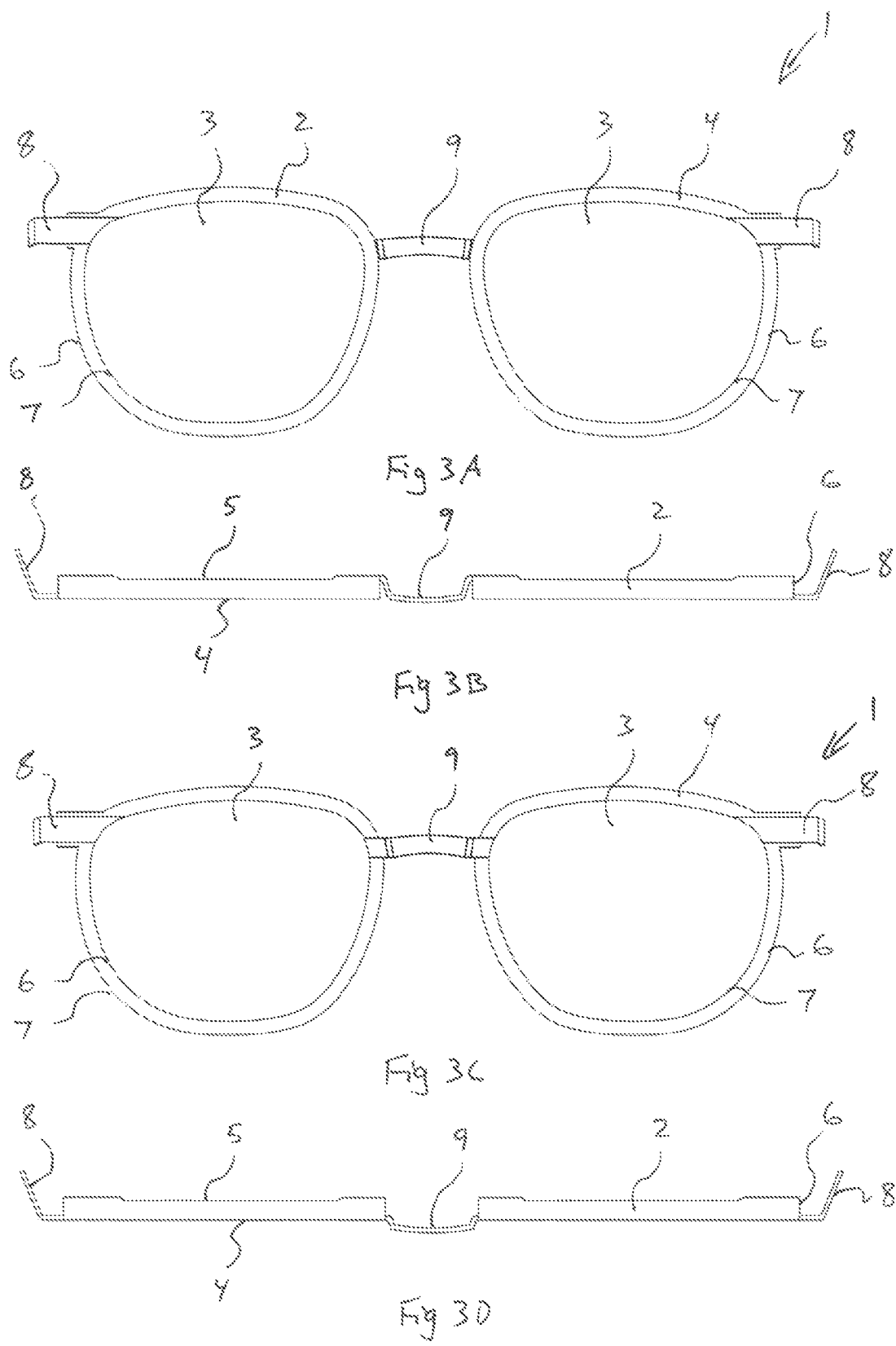

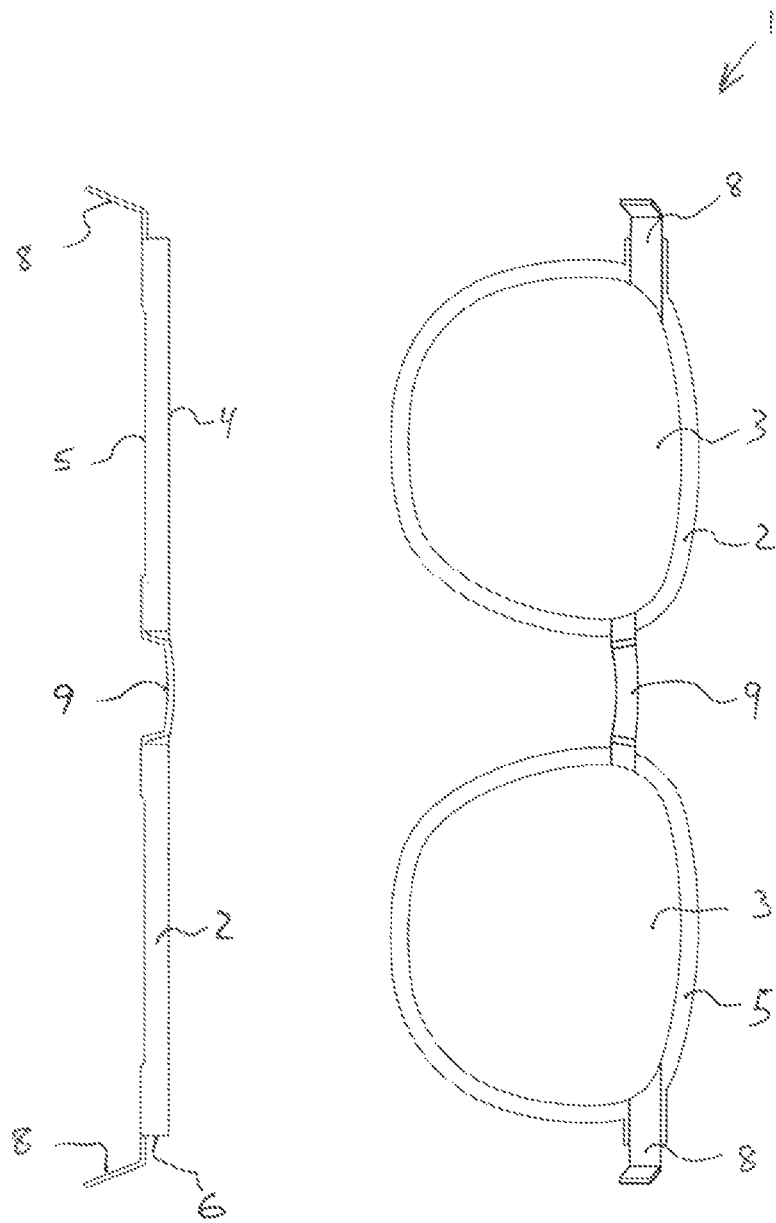

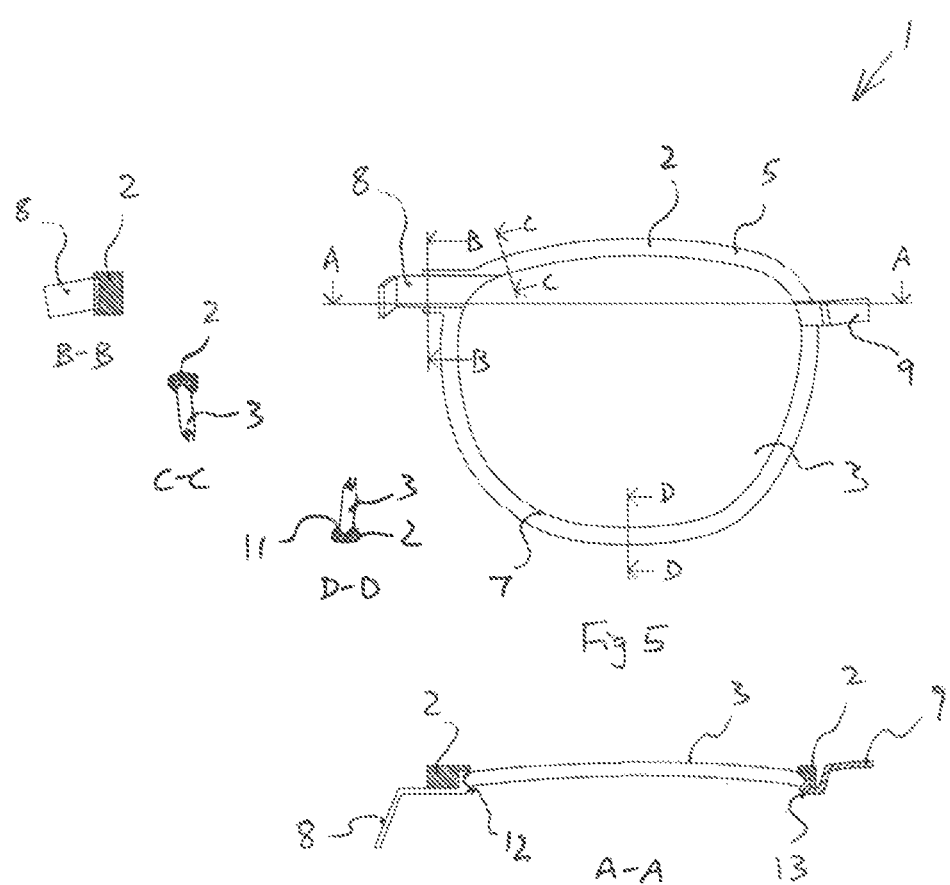

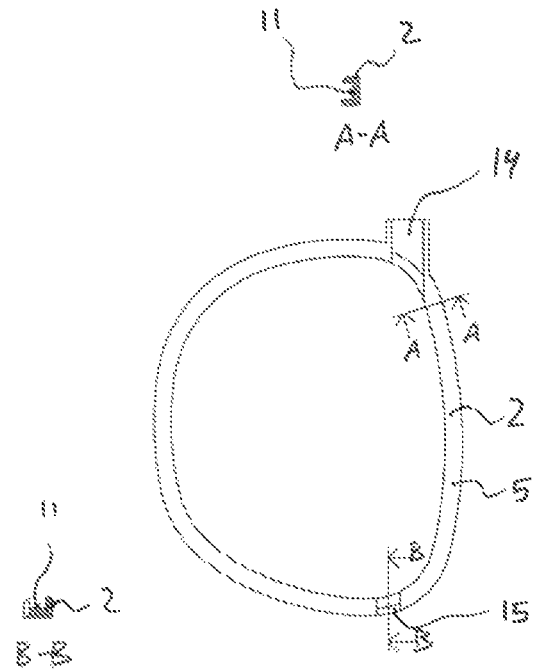
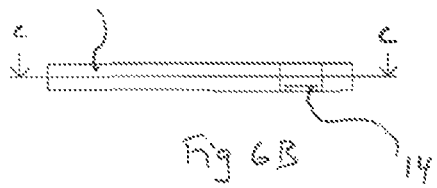
Fig 6A
Fig 6B
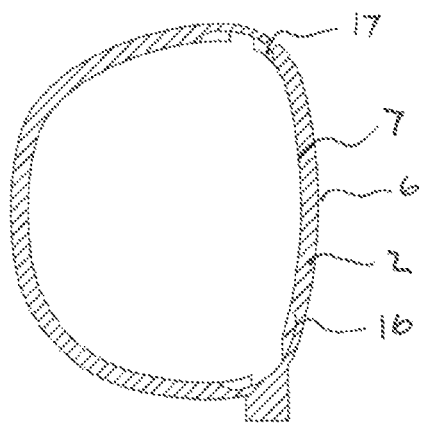
C-C

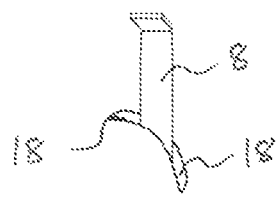
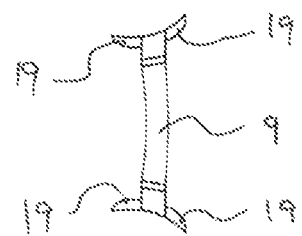
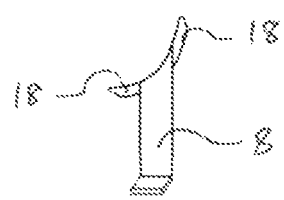
Fig 7

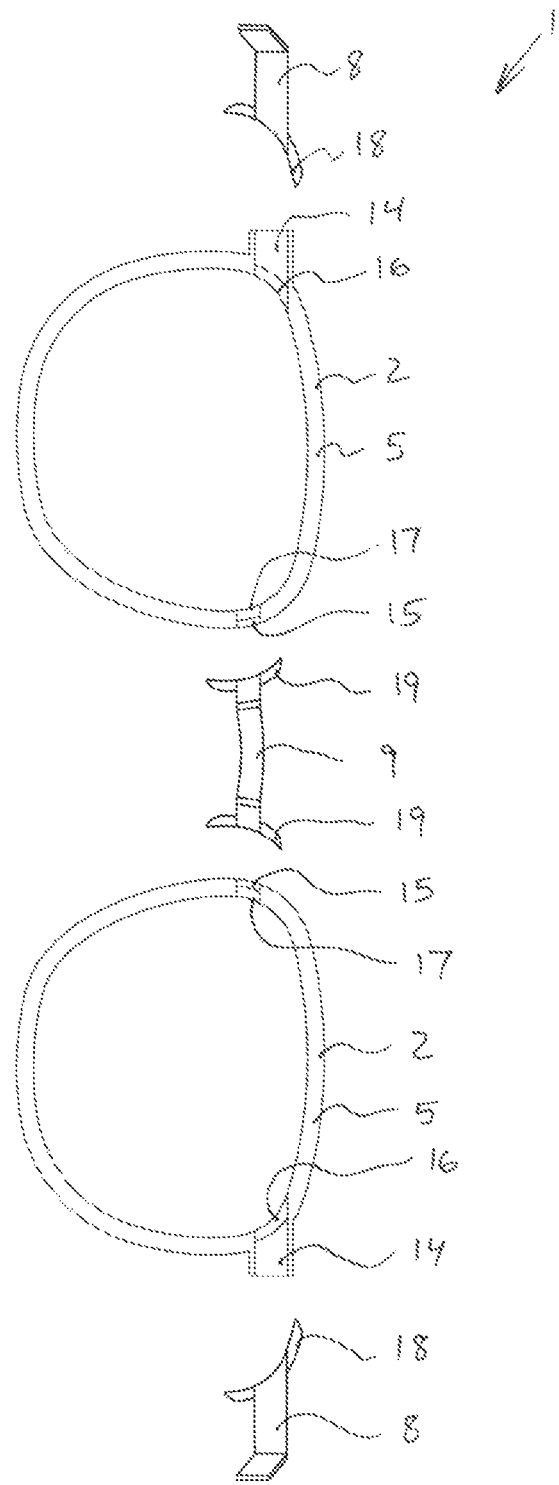

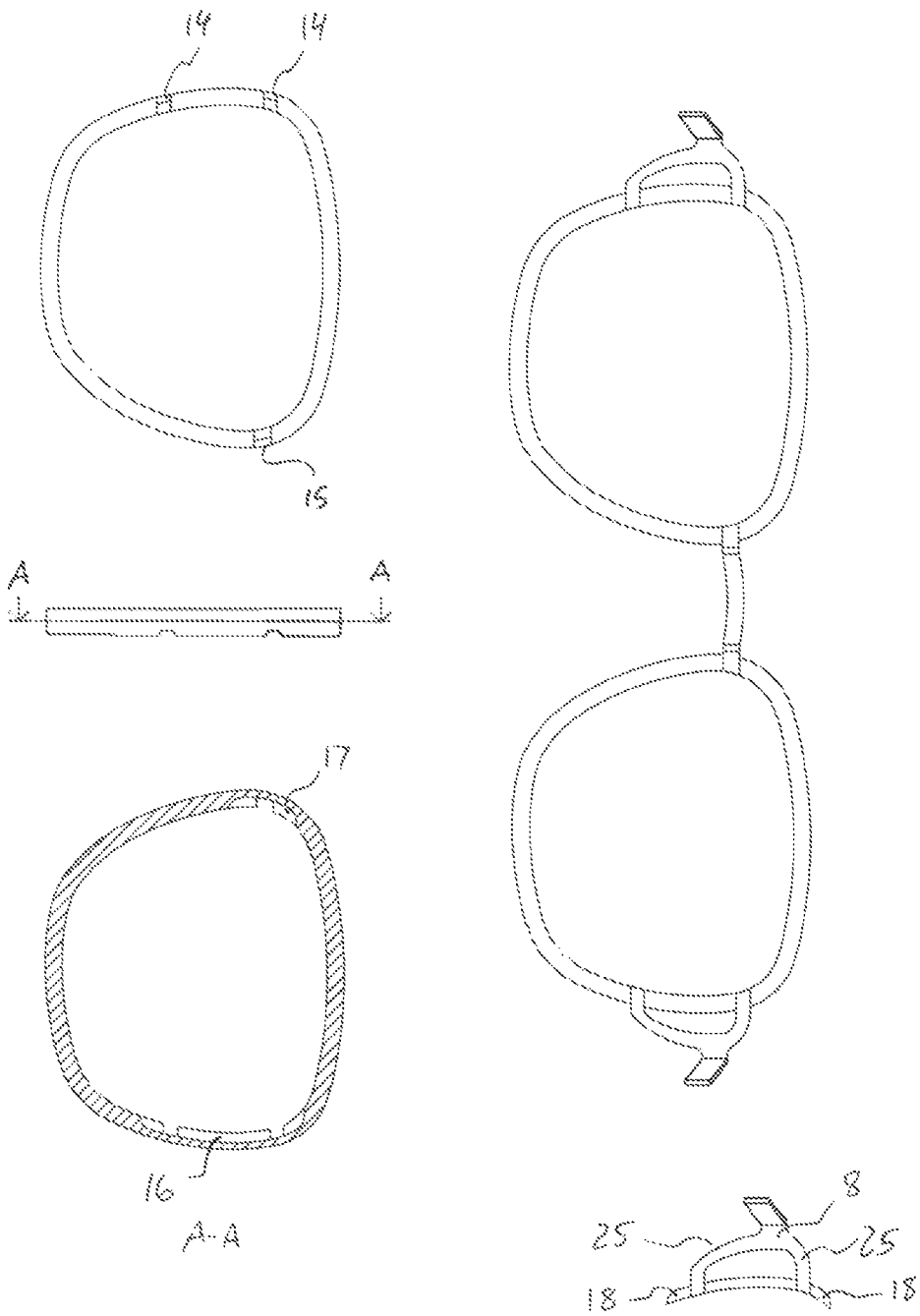

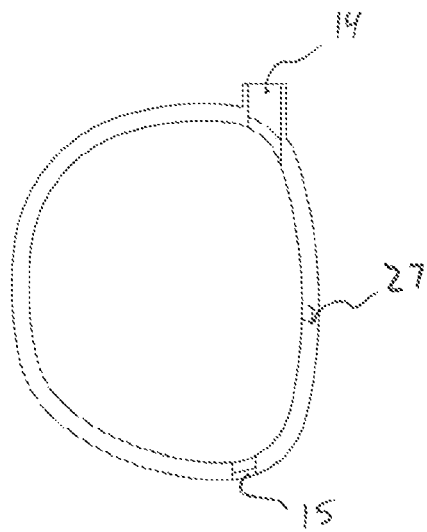
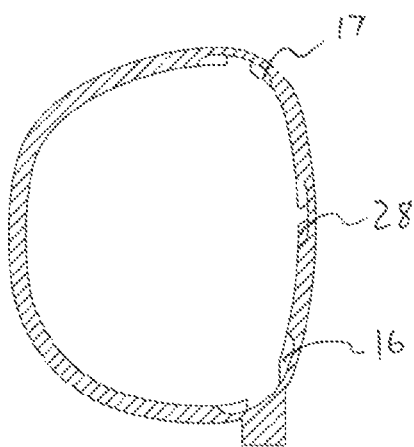
A-A
Fig 21

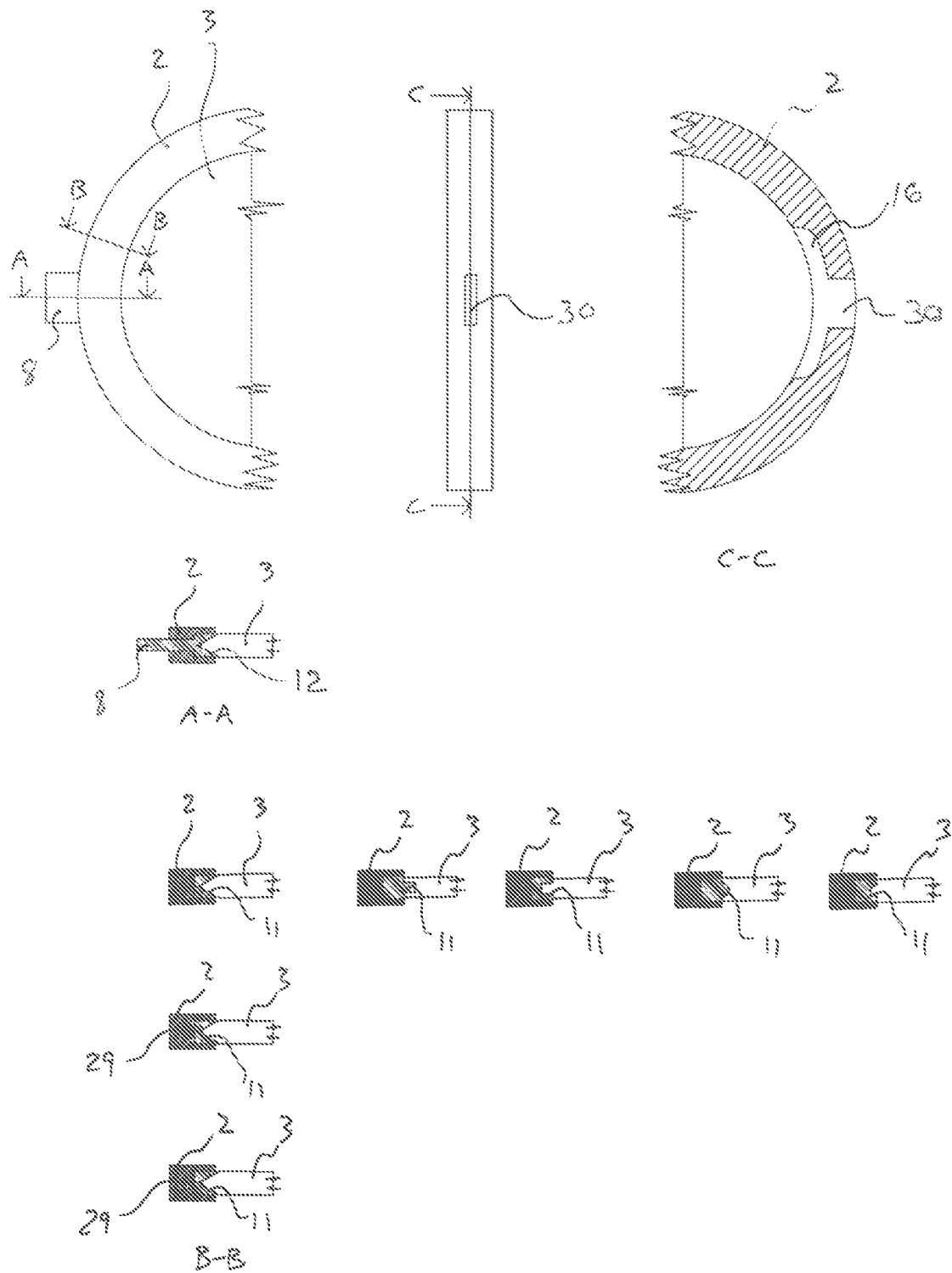

SELF-LOCKING EYEGLASS SYSTEM

RELATED APPLICATIONS

This application is a continuation of International Application No. PCT/DK2020/050033, which designated the United States and was filed on Feb. 10, 2020, published in English, which claims priority to Denmark Application No. PA 2019 70097, filed Feb. 11, 2019. The entire teachings of the above applications are incorporated herein by reference.

SELF-LOCKING EYEGLASS SYSTEM

The present invention concerns a self-locking eyeglass system, comprising at least one locking element and at least one frame element, where the at least one frame element comprises a front side, a back side, an outer side with an external circumference and also an inner side and an internal circumference, where the at least one frame element further comprises a connecting element, which is intended for connecting to a locking element, where the at least one frame element is unbroken in its external circumference, and where the connecting element is provided on the inner side, where the self-locking eyeglass system further comprises two hinge elements and two temple bars, where the at least one frame element via the hinge elements is connected to the temple bars, where each hinge element has a connection element which coincides with the frame element's connection element, when the hinge elements are mounted in the at least one frame element, and where each hinge element is locked fixed to the at least one frame element of a locking element.

PRIOR ART

Eyeglass systems are known, that comprise at least one lens and at least one frame element, where the at least one frame element comprises a front side, a back side, an outer side with an external circumference and an inner side with an internal circumference, where the at least one frame element further comprises a connection element which is intended to connect with an eyeglass lens.

Eyeglass systems with an eyeglass lens and a frame element are used, among other things, as sunglasses, where several interchangeable eyeglass lenses follow a frame and thus can be exchanged according to the sun situation.

An eyeglass system is also known from WO8705123, where a frame element which preferably is made of metal or plastic is heated, after which the eyeglass lens is placed in the frame element and is connected when cooled.

From U.S. Pat. No. 2,132,106 an eyeglass system is also known, where eyeglass lenses are placed in a casing of the frame element, after which the edge of the frame element is curved/bent down towards the eyeglass lenses—preferably without use of heat—and thus are connected.

From U.S. Pat. No. 4,196,982 yet another eyeglass system is known, comprising a frame element and also two eyeglass lenses, where the eyeglass lenses can be put in the frame element and be exchange with just manual force and without the use of heat.

From US 2005/0036101 an eyeglass system is known, of the type named in the introduction. Here, there is no description of any form of adapter element which can establish a stable mounting of the hinge element on the frame element.

OBJECT OF THE INVENTION

The fundamental purpose of the invention is to make it convenient, flexible and uncomplicated to assemble, separate, replace and service a self-locking eyeglass system without the use of tools, where the eyeglass system in addition to the frame element and the locking element in the form of eyeglass lenses, additionally also comprises hinge elements, and where such hinge elements can be stably mounted on the frame element.

In other words, it is a purpose to show an eyeglass system where only the manual human force is necessary to place or remove an eyeglass lens, and where it is exactly eyeglass lenses which as locking elements are manually pressed into the frame element, which constitutes the most important locking function in the self-locking eyeglass system. In the eyeglass system, the hinge elements are locked fixed by the eyeglass lens. Here, additional elements as for example temple bars, be locked onto the frame element.

DESCRIPTION OF THE INVENTION

According to one aspect of the invention, the above purposes are achieved with a self-locking eyeglass system as has been described in the introduction, and as described in the preamble of claim 1, where each hinge element comprises an adapter element, which is complementary to at least one first recess in the at least one frame element, where the at least one first recess is provided from the inner side in the direction towards the outer side and that the hinge elements are mounted in the at least one frame element's first recess and that the at least one frame element additionally comprises at least one second recess extending on at least one of the frame element's front side and back side, wherein the second recess extends between the frame element's at least one first recess and the frame element's outer side, wherein the second recess is intended to accommodate the hinge element.

This makes it possible to receive the at least one hinge element. It rotationally secures the hinge elements and thus the temple bars, as the connection elements prevent that the hinge elements and thus also the temple bars from moving along the frame element's inner side or outer side, and interacting with the first recess in the frame element, the temple bars also cannot move in direction transversal to the frame element's front side and back side.

For eyeglasses with one frame element and only one eyeglass lens, for example sport glasses or sunglasses, it is made possible to collect and lock in place the hinge elements onto the frame element, also called the casing, where the locking takes place when the eyeglass lens is put in place, the lens is the locking element in the frame element, where the hinge elements are not able to fall out from the at least one frame element's first recess. The adapter elements ensure that the hinge elements sit stably on the frame Self-locking thus means that the eyeglass system's elements together can be locked and hold the relatively few elements of the eyeglasses, and thus without use of screws, nails, rivets, strings or other loose parts that are generally known as holding implements.

With an unbroken frame element is meant that the frame element is in one piece and does not have joints that can be opened or closed, to set a locking element in place in the frame element.

The connection element will, in a preferred embodiment, be placed along the whole frame element's inner side, but can in an alternative embodiment be placed along a part of the inner side of the frame element, and in yet another alternative embodiment, there can be connection elements arranged in several places around the inner side of the frame element, separate from each other by a space without connection elements.

The frame element can be made of metal or plastic. For example, metal in the form of steel or titanium or a plastic material of a type that is commonly used at the manufacture of eyeglasses.

The present invention concerns in an additional aspect also a self-locking eyeglass system, where the eyeglass system comprises an additional locking element.

That is to say that the eyeglass system comprises at least two locking elements.

For an eyeglass with one frame element and two locking elements, where both are eyeglass lenses, it is here made possible to collect and lock the hinge elements to the frame element, also called the casing, where the locking takes place by putting the locking element into the frame element, where the hinge elements are not able to fall out of the first recess in the at least one frame element.

The present invention concerns, in an additional aspect, also a self-locking eyeglass system, where the eyeglass system comprises an additional frame element and a nose bridge. The nose bridge connects the frame elements, and the nose bridge comprises adapter elements, which are complementary to the at least one first recess in each of the frame elements.

Each adapter element, whether it is for the hinge element or the nose bridge has a connection element, which coincides with the frame element's connection element, when the adapter element of the nose bridge is mounted in a frame element's first recess. The nose bridge's adapter elements are secured to each its own frame element by a locking element.

For eyeglasses with two frame elements and two eyeglass lenses, it is here made possible to connect, collect and lock in place both the nose bridge and the two hinge elements to the two frame elements, where the locking takes place when the locking elements are put in place.

The present invention concerns in an additional aspect, and also a self-locking eyeglass system, where frame element, hinge element and also nose bridge have connection elements, which are suitable for connection to a locking element.

This makes it possible, if frame element, hinge element and the possible nose bridge have connection elements in the form of depressions (groove or recess), to receive a locking element therein. The depression may thus be provided in an embodiment without a nose bridge.

In a preferred embodiment, a frame element has a connection element with two side surfaces, where one side surface thus can be everted out over the locking element, after which the connection element has a side surface on each side of the locking element, to hold in place the locking element. A connection element which comprises a depression with a bottom surface and two side surfaces, thus makes it possible to receive a part of the locking element's side surface area, whereby the locking element is held fast.

With a connection element, which consists of a depression and comprises a bottom surface and two side surfaces, is meant a groove which essentially has a U-shape or a V-shape, where the bottom surface can have an arbitrary shape, and where the transition to the side surfaces can be either a sharp separation or a curve shaped separation, but where there shall be side surfaces to prevent that the eyeglass lens falls out of the frame element.

In another embodiment, the frame element, the hinge element and also the nose bridge have connection elements in the form of a protrusion (tongue) to receive a locking element. If this embodiment is used, it requires that the locking element has a depression which is complementary to the protrusion, as a connection otherwise will not be a possibility.

The present invention concerns, in a further aspect, also a self-locking eyeglass system, where each frame element further comprises at least one further second recess extending on at least one of the frame element's front side and back side, where the further second recess extends between the frame element's at least one first recess and the frame elements outer side, where the further second recess is intended to accommodate the nose bridge.

This makes it possible to receive the nose bridge in such way that the connection element rotationally secures also the nose bridge.

It is possible to receive eyeglass elements such as the at least one hinge element and/or the nose bridge.

One thing does not exclude the other, so both hinge elements and the nose bridge can thus have connection elements in the frame elements, which prevent rotation.

The present invention concerns in an additional aspect also a self-locking eyeglass system, where each frame element additionally comprises at least one further second recess extending on at least one of the frame element's front side and back side, where the further second recess extends between the frame element's at least one first recess and the frame element's outer side, where the further second recess is intended to accommodate a secondary eyeglass element.

This makes it possible to receive secondary eyeglass elements, such as additional stiffening elements besides the nose bridge, or to receive elements without any actual functional properties, but elements of more of an architectural/design character.

The present invention concerns, in an additional aspect, also a self-locking eyeglass system, where at least one of the adapter elements on the hinge elements and the adapter elements on the possible nose bridge comprises a longitudinal connection element, which when the adapter element is mounted in the frame element, is essentially lying in the same plane as the edge of an inserted locking element, and where the connection element is precisely intended to interact with a locking element. The longitudinal connection element may thus be provided in an embodiment without a nose bridge.

Thereby, the adapter elements will also function as an adapter element to retention of the locking element. In a preferred embodiment the connection elements are alike, regardless of whether it is a connection element in a frame element, a hinge element or a nose bridge, whereby the connection elements in the circumference of the frame element are substantially alike.

The present invention concerns, in an additional aspect, also a self-locking eyeglass system where at least one of the adapter elements on the hinge elements and the adapter elements on the possible nose bridge comprise a different material on the side of the adapter elements, which is intended to face a locking element.

This makes it possible to coat the adapter elements' connection elements or to put a packing element between the connection elements and the eyeglass glass, thus to ensure that there is no direct contact between the eyeglass glass and the materiel of which the connection elements are made, as for example a metal in the form of steel or titanium. Alternatively, the connection elements can be a plastic material of a type that is commonly used when manufacturing eyeglasses.

The present invention concerns, in an additional aspect, also a self-locking eyeglass system, where the adapter elements on the hinge elements and the adapter elements on the possible nose bridge are adapted to the first recesses in the frame elements, such that both the adapter elements on the hinge elements and the adapter elements on the nose bridge have opposite pulling and pushing forces, relatively to the frame elements.

This makes it possible that the nose bridge and the hinge elements can be moved in parallel in the direction away from the frame elements and thus in the direction of the outer side of the frame elements, after which they are locked in place in the frame elements by the locking elements, when the locking elements are inserted into the frame elements. In a preferred embodiment, the parallel move can be done along a line, where the forces are directly opposed, but in alternative embodiments the adapter elements on the nose bridge and the adapter elements on the hinge elements be moved only in the direction of the frame elements' outer side to the for this purpose desired and for this purpose constructed place on the frame elements The present invention concerns, in an additional aspect, also a self-locking eyeglass system where the eyeglass system additionally comprises at least one clasp with a respective clasp arm and clasp cushion, where the clasp is placed on one of the at least one frame element and the possible nose bridge, respectively.

Thus, it is possible to manufacture the clasp or at least the clasp arm at the same time as the manufacture of the bridge, alternatively the clasps shall be mounted later, on the bridge or directly on a frame element.

The present invention concerns, in an additional aspect, also a self-locking eyeglass system, where the frame elements are manufactured of material with elastic properties.

Where, by the frame element having elastic properties, is meant that the frame element is capable of yielding so much that a locking element via a snap function can be pressed in engagement with the frame element's connection element, where the locking element can be held fast and constitute the locking element for the adapter elements.

Thus, it is made possible to insert the locking element into a frame element which is unbroken in its circumference, in that the elastic and flexible properties causes that a locking element can manually be pressed into a frame element, where the locking element engages with the connection element of a frame element and at the same time the adapter elements are locked in their position in the recesses in the frame element.

DRAWINGS

The invention will in the following be explained in more detail by description of non-limiting embodiments, with reference to the figures, where:

Figure 8:
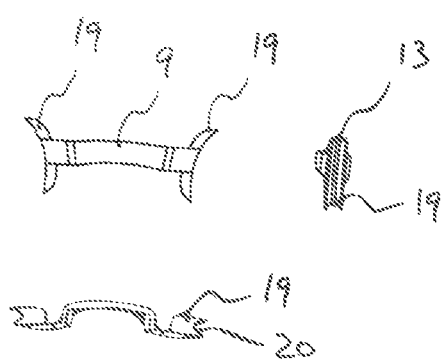
Figure 9:
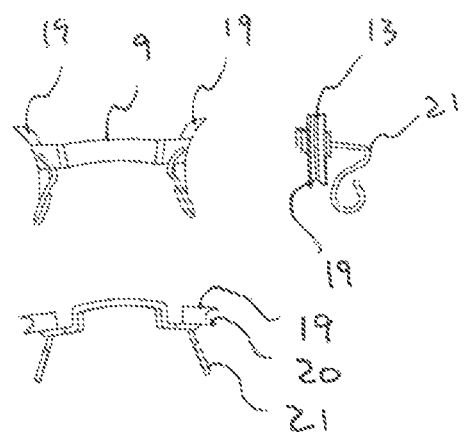
Figures 12A, 12B:
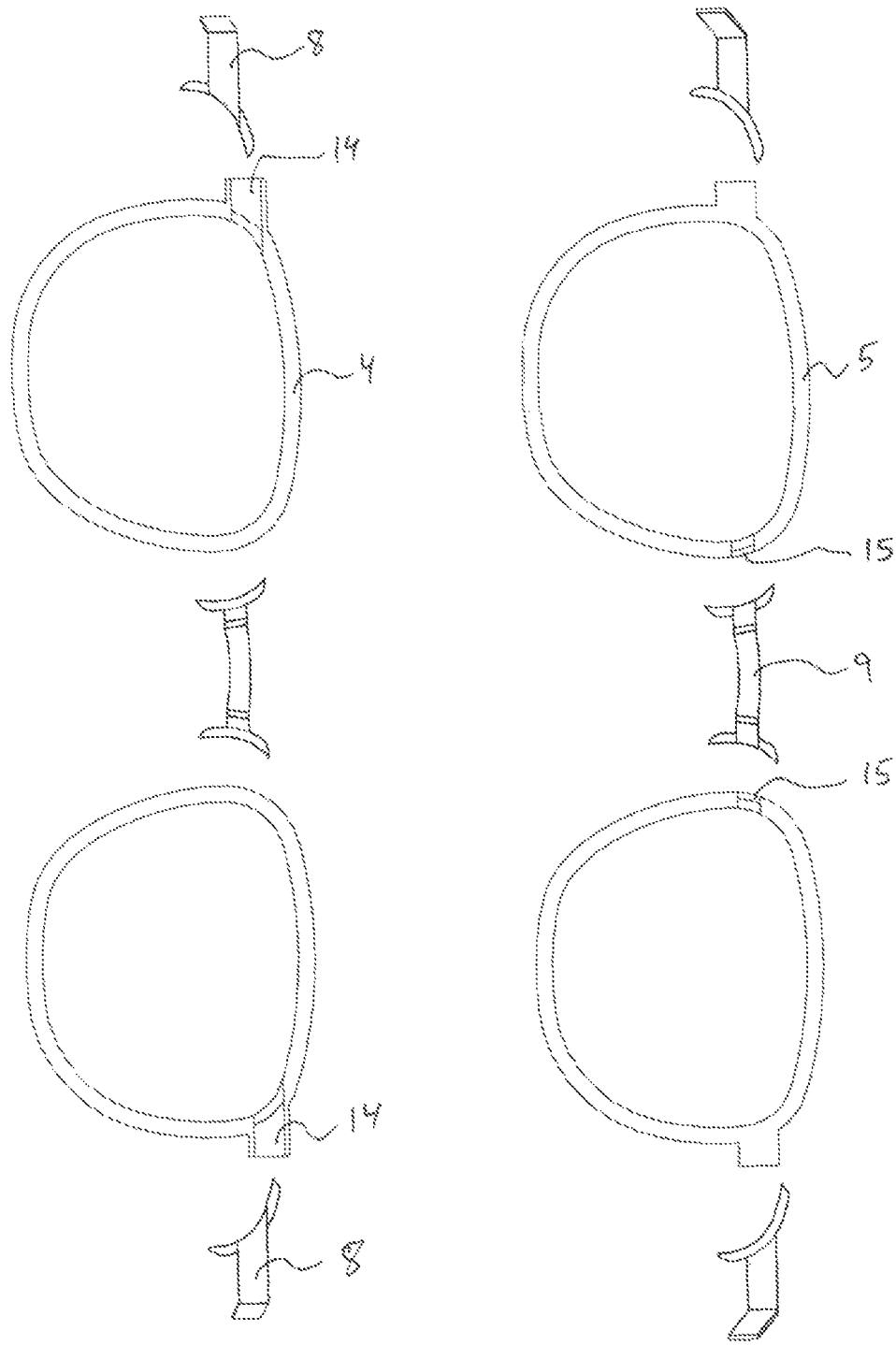
Figure 13:
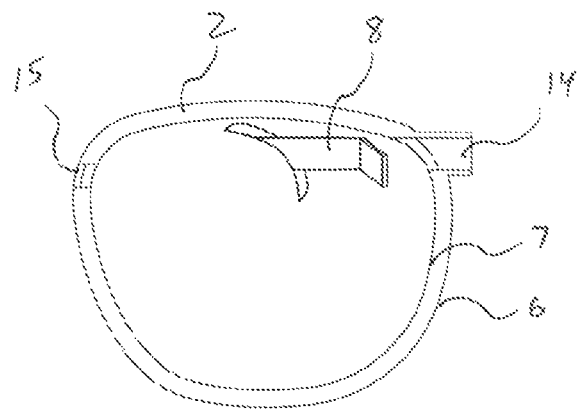
Figure 13:
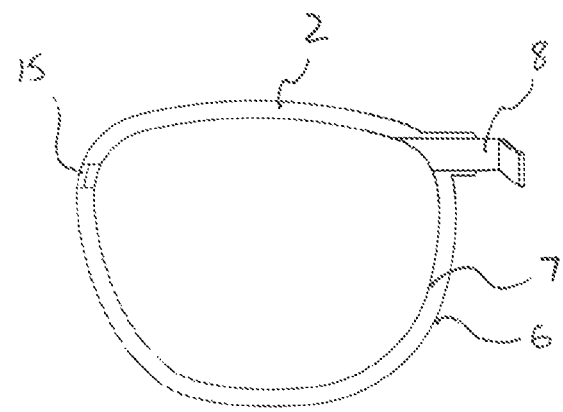
Figure 15A:
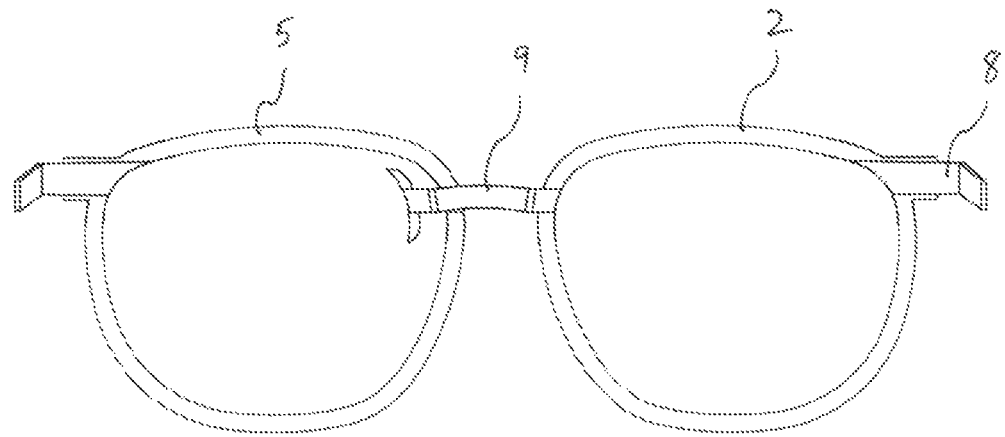
Figure 15B:
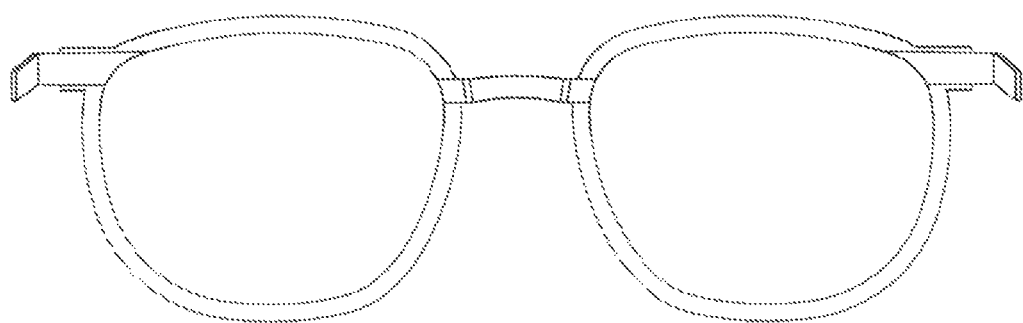
Figure 16:
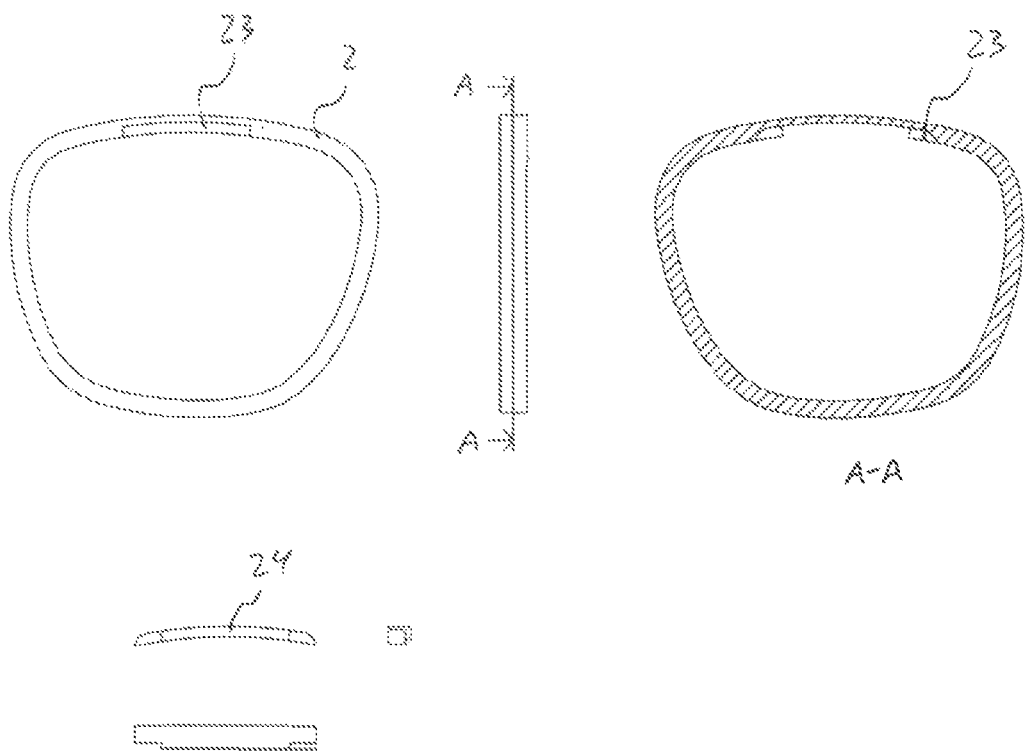
Figures 19A, 19B:
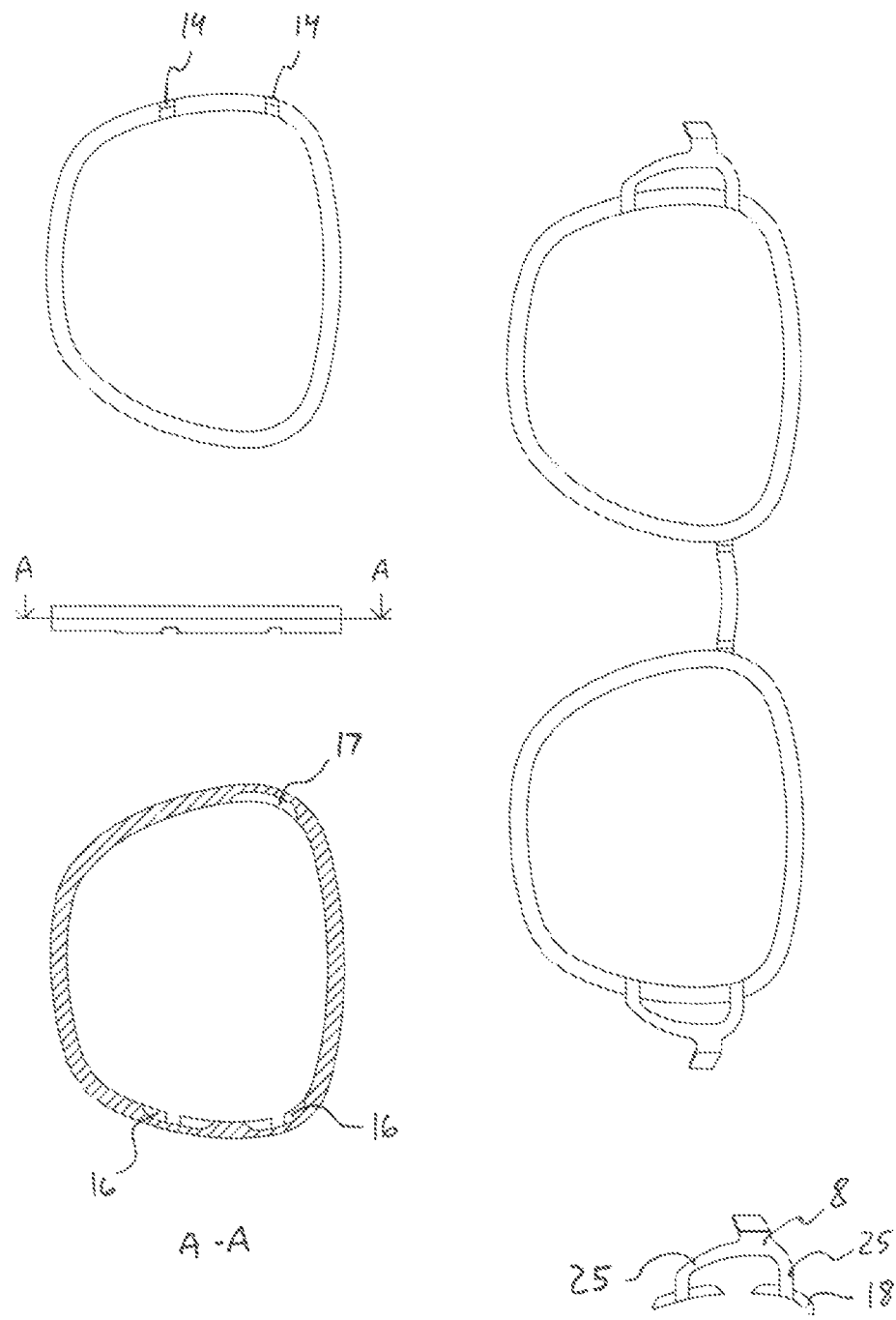
Figure 20:
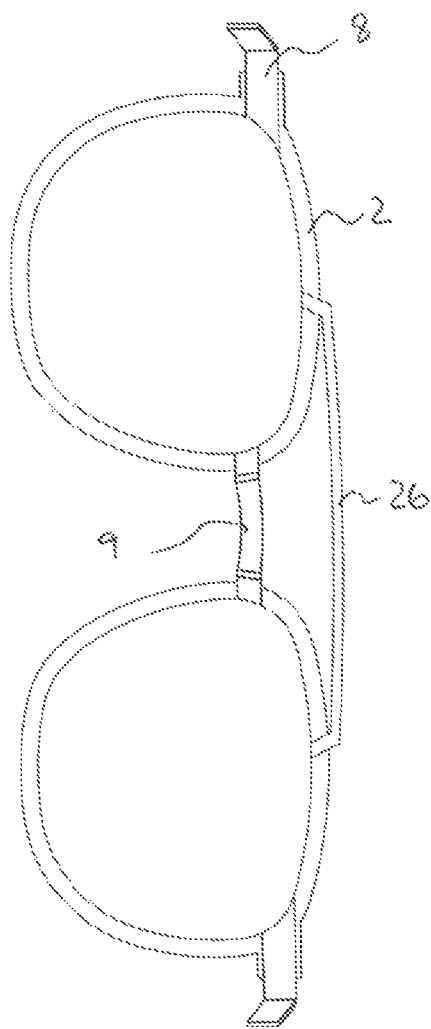
Figure 22:
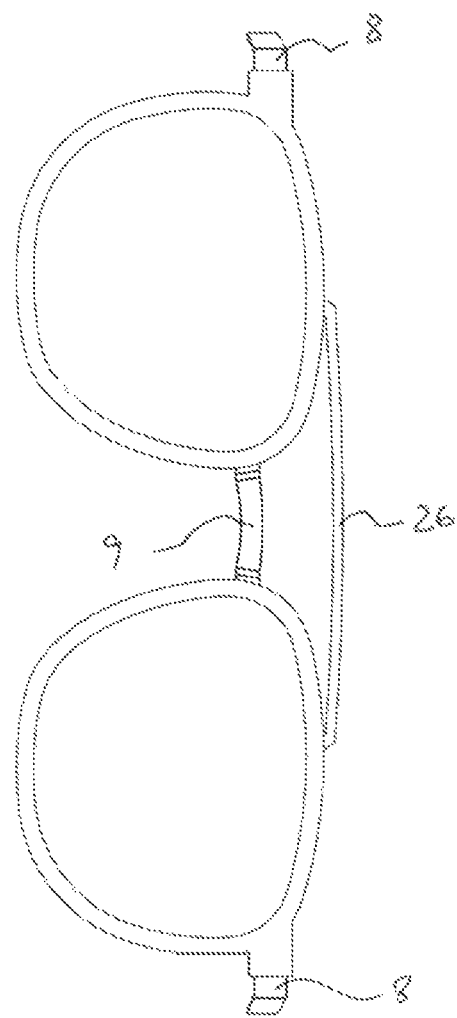
Figure 23:
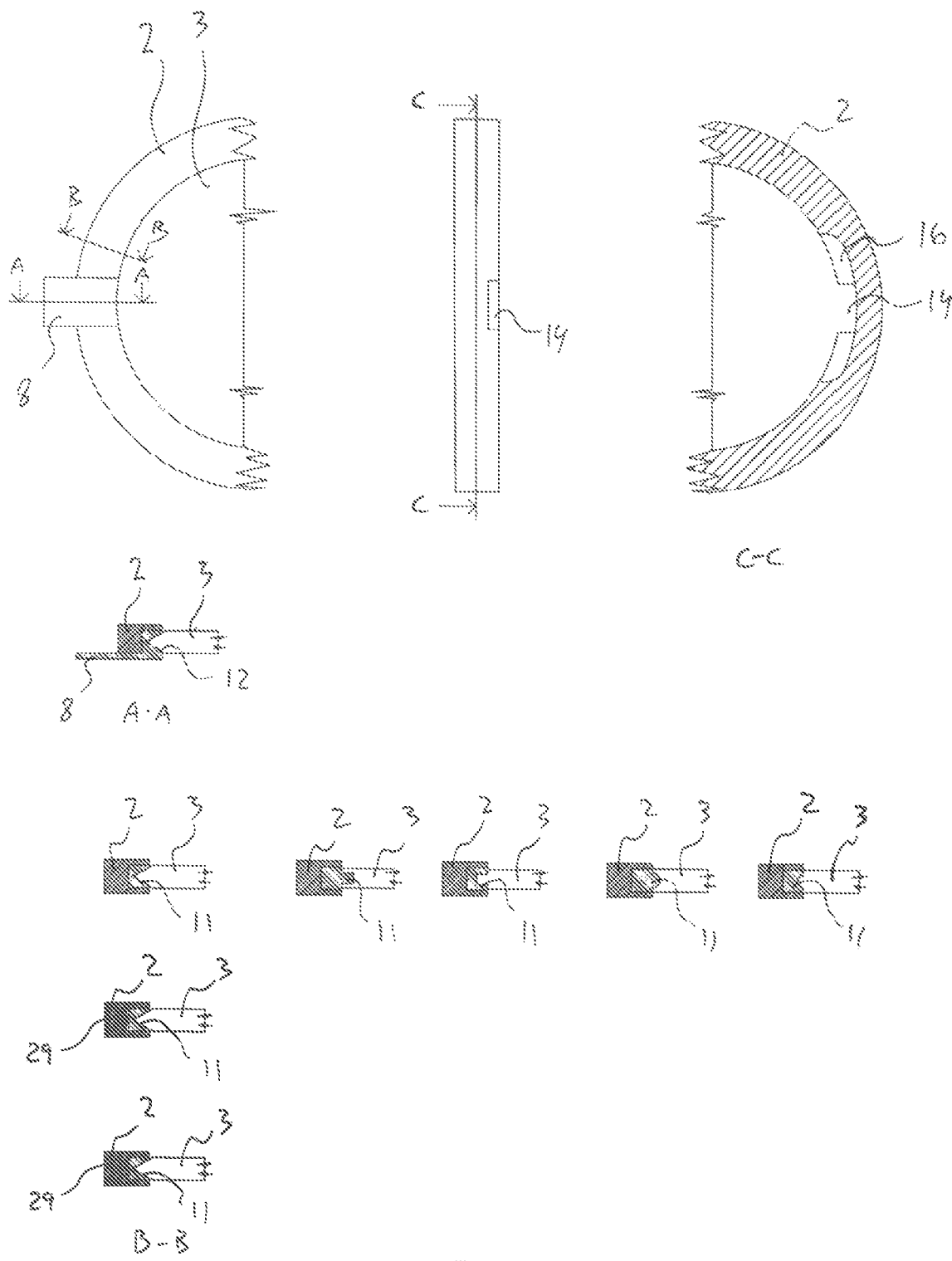

FIG. 3 shows an eyeglass system with two frame elements and two locking elements, FIG. 4 shows an eyeglass system with two frame elements and two locking elements, where the frame elements are prepared for a clasp, FIG. 5 shows details of an assembly of an eyeglass system, FIG. 6 shows details of a frame element, FIG. 7 shows variants of hinge elements and nose bridges, FIG. 8 shows variants of nose bridges, FIG. 9 shows variants of nose bridges with clasp, FIG. 10 shows details of hinge elements, FIG. 11 shows a separate eyeglass system, FIG. 12 shows another separate eyeglass system, FIG. 13 shows the assembly of hinge elements with frame elements, FIG. 14 shows the attachment of a nose bridge to a frame element, FIG. 15 shows the attachment of a nose bridge to another frame element, FIG. 16 shows a variant of a frame element, FIG. 17 shows a variant of an eyeglass system, FIG. 18 shows an additional variant of an eyeglass system, FIG. 19 shows yet another variant of an eyeglass system, FIG. 20 shows a variant of an eyeglass system with a bar, FIG. 21 shows a frame element with a bar, FIG. 22 shows an additional variant of an eyeglass system with a bar, FIG. 23 shows details of an embodiment of the connection between a frame element, a hinge element and a locking element, FIG. 24 shows details of another embodiment of the connection between a frame element, a hinge element and a locking element.

In the description of the figures, identical or corresponding elements will be given the same reference number in the different figures. Thus, an explanation of all details in each figure/embodiment will not be given.

LIST WITH REFERENCE NUMBERS

1 Eyeglass system
2 Frame element
3 Locking element
4 Front side, Frame element
5 Back side, Frame element
6 Outer side, Frame element
7 Inner side, Frame element
8 Hinge element
9 Nose element
11 Connection element, Frame element
12 Connection element, Hinge element
13 Connection element, Nose bridge
14 Second Recess, Frame element for Hinge element
15 Second Recess, Frame element for nose bridge
16 First Recess, Frame element for Hinge element
17 First Recess, Frame element for nose bridge
18 Adapter element, Hinge element
19 Adapter element, Nose bridge
20 Groove
21 Clasp arm
23 Recess, Frame element for locking device
24 Locking device
25 Arm, Hinge element
26 Rod/Secondary eyeglass element
27 Second Recess, Frame element for rod
28 First Recess, Frame element for rod
29 Spring element
30 Hole.

DETAILED DESCRIPTION OF THE INVENTION

A self-locking eyeglass system according to the invention is shown in the FIGS. 1-12.

Figure 1A:
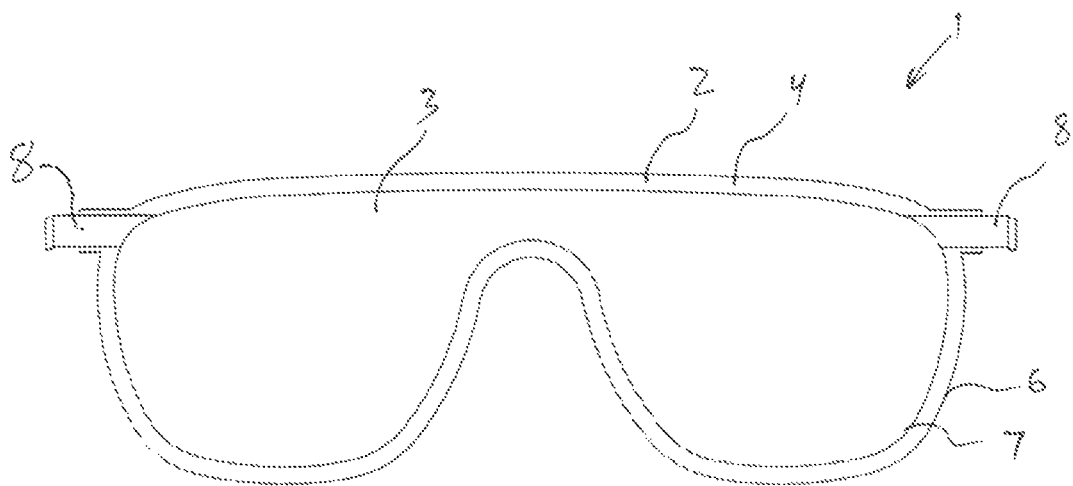
FIG. 1 shows an eyeglass system with a frame element and a locking element.
Figure 1B:
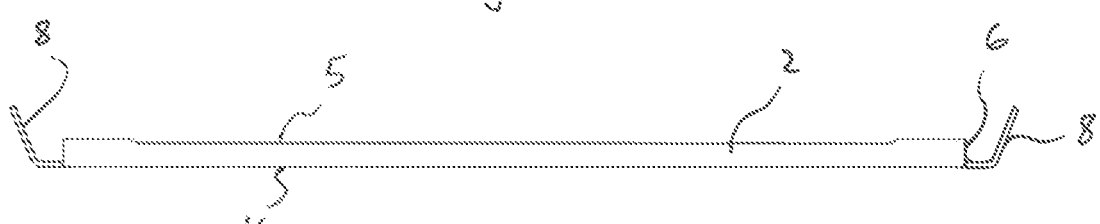
Figure 1C:
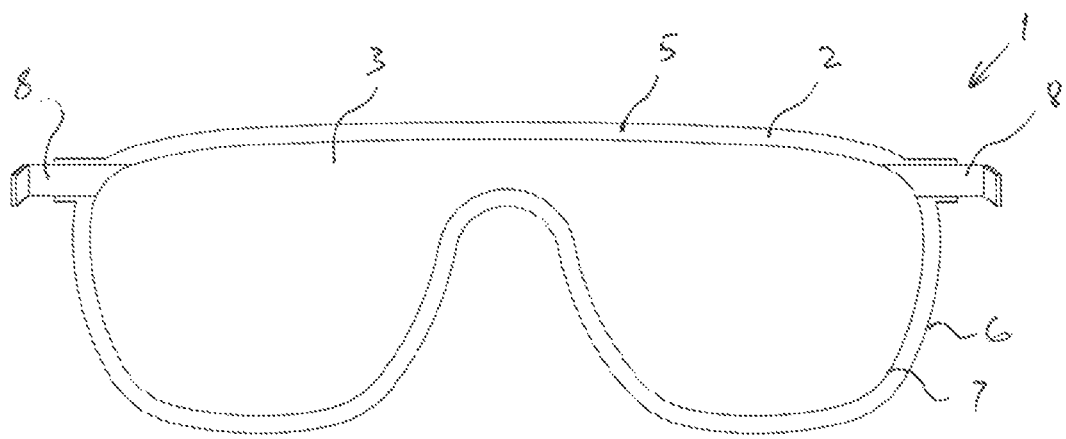
Figure 1D:
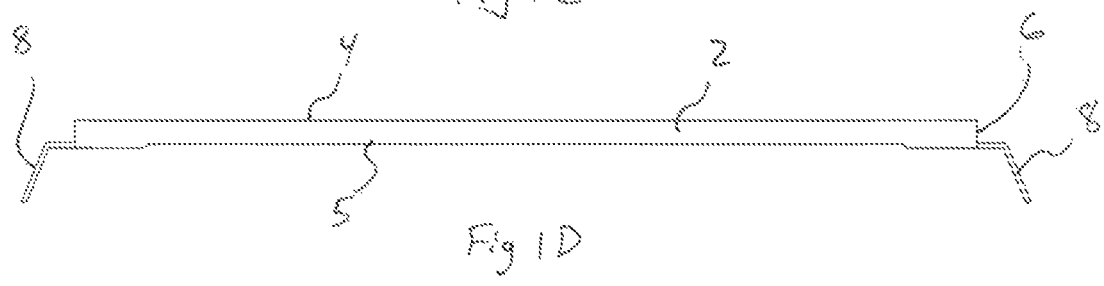

FIG. 1 shows in FIG. 1A-1B a variant and in FIG. 1C-1D another variant of a self-locking eyeglass system 1 with a frame element 2 and a locking element 3, where the frame element 2 has s front side 4, a back side 5, an outer side 6 with an external circumference and an inner side 7 with an internal circumference, where the frame element 2 is unbroken in its external circumference, and where the self-locking eyeglass system 1 has two hinge elements 8. The Frame element 2 is, via the hinge elements 8 intended for connection with eyeglass bars, not shown.

Figure 2A:
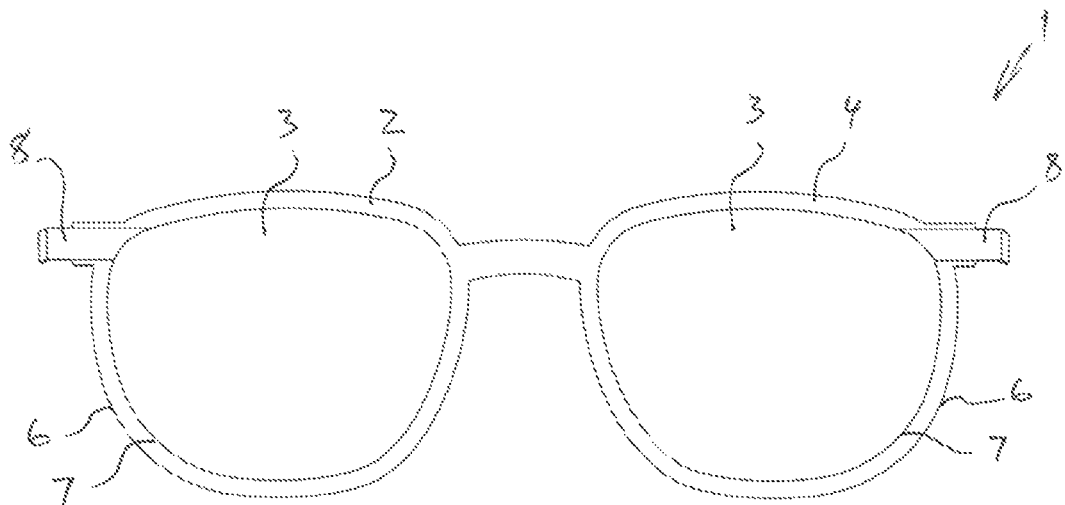
FIG. 2 shows an eyeglass system with et frame element and two locking elements.
Figure 2B:
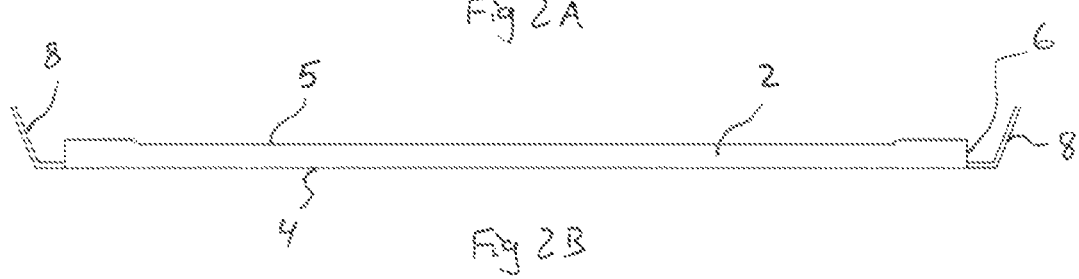
Figure 2C:
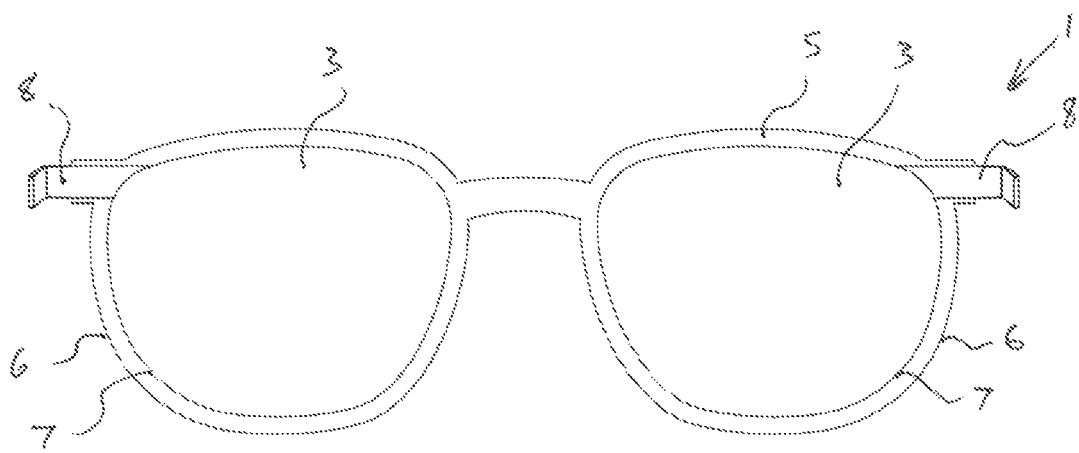
Figure 2D:
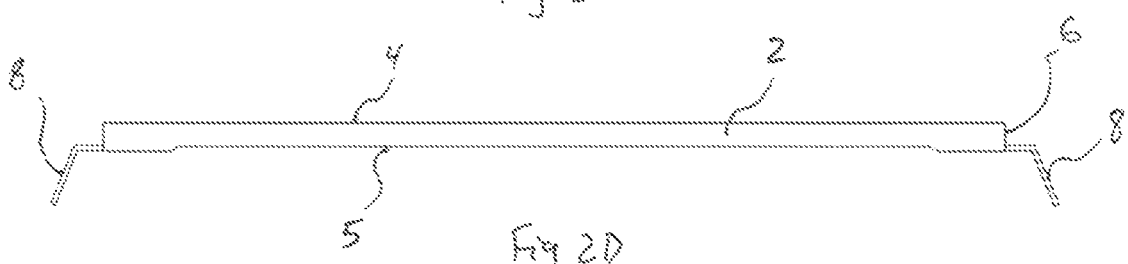

FIG. 2 shows in FIG. 2A-2B a variant and in FIG. 2C-2D another variant of a self-locking eyeglass system 1 with a frame element 2 and two locking elements 3, where the frame element 2 has a front side 4, a back side 5, an outer side 6 with an external circumference and an inner side 7 with an internal circumference, where the frame element 2 is unbroken in its external circumference and where the self-locking eyeglass system 1 has two hinge elements 8. The frame element 2 is via the hinge elements 8 intended to connection with not shown temple bars.

FIG. 3 shows in FIG. 3A-3B a variant and in FIG. 3C-3D another variant of a self-locking eyeglass system 1 with two frame elements 2 and two locking elements 3, where the frame elements 2 have a front side 4, a back side 5, an outer side 6 with an external circumference and an inner side 7 with an internal circumference, where the frame elements 2 are unbroken in their external circumference, and where the self-locking eyeglass system 1 has two hinge elements 8 and a nose bridge 9, where the nose bridge 9 connects to the frame elements 2. The frame elements 2 are, via the hinge elements 8 intended for connection with temple bars, not shown.

FIG. 4 shows in FIG. 4A-4B yet another variant of a self-locking eyeglass system 1 with two frame elements 2, and two locking elements 3, where the frame elements 2 have a front side 4, a back side 5, an outer side 6 with an external circumference and an inner side 7 with an internal circumference, where the frame elements 2 are unbroken in their external circumference, and where the self-locking eyeglass system 1 has two hinge elements 8 and a nose bridge 9, where the nose bridge 9 connects the frame elements 2.

FIG. 5 shows the details for an assembly of an eyeglass system 1 with a frame element 2, wherein there is mounted a hinge element 8 and a nose bridge 9, which is locked to the frame element 2 by a locking element 3. The figure shows different cross-sections of the eyeglass system 1, A-A from which it can be seen, how a hinge element 8 and a nose bridge 9 are connected in relation to the frame element 2 and in relation to the locking element 3, B-B shows a cross-section at the hinge element 8, C-C and D-D show cross sections of other places in the frame element 2.

Cross section D-D additionally shows that the frame element 2 has connection elements 11, which are intended for connection with a locking element 3, and that the connection elements 11 are provided on the inner side 7 of the frame element 2.

Cross section A-A additionally shows that the hinge element 8 also has connection elements 12 and that the nose bridge 9 has connection elements 13, which also are intended for connection with a locking element 3.

FIG. 6 shows details of a frame element 2, where the frame element comprises a second recess 14 running on the back side 5 of the frame element, where the second recess 14 runs between the frame element's inner side 7 and the frame element's outer side 6, where the second recess 14 is intended to accommodate a hinge element 8.

In the same manner, FIG. 6 shows details of a frame element 2, where the frame element also comprises a second recess 15 that runs on the frame element's back side 5, where second the recess 15 runs between the frame elements inner side 7 and the frame element's outer side 6, where the second recess 15 is intended to accommodate a nose bridge 9.

In the same manner, FIG. 6 shows different cross sections of the frame element 2, A-A shows a cross section of the frame element 2 and the frame element's connection element 11, B-B shows a cross section of the frame element x 2, where the nose bridge 9 is placed.

FIG. 6B shows the frame element 2 seen from the outer side 6 where the hinge element 8 is placed.

Cross-section C-C shows a first recess 16 in the frame element 2, where the first recess 16 is provided from the inner side 7 in the direction towards the outer side 6. The first recess 16 is intended to accommodate a hinge element 8. Correspondingly, there is shown a first recess 17 in the frame element 2, where the first recess 17 is provided from the inner side 7 in the direction towards the outer side 6, where the first recess 17 is intended to accommodate a nose bridge 9.

FIG. 7 shows hinge elements 8 and nose bridge 9, where each hinge element 8 comprises an adapter element 18, which is complementary to a first recess 16 in a frame element 2, and where the nose bridge 9 comprises adapter elements 19, which are complementary to the first recesses 17 in the frame elements 2.

FIG. 8 shows a nose bridge 9, from which it can be seen that nose bridge 9 has adapter elements 19, where each adapter element 19 has a connection element 13, which is intended for connection with a locking element 3. The longitudinal connection element 13, which reaches the adapter element 19 is mounted in a frame element 2, is essentially lying in the same plane as the edge of a placed locking element 3, and where the connection element 13 is intended to interact with a locking element 3 via a groove 20.

The adapter elements 19 on the nose bridge 9 can also comprise another material on the side of the adapter elements 19, which are intended to face a locking element 3, meaning on the connection element 13.

FIG. 9 shows a nose bridge 9 with integrated clasp arm 21 (on the clasp arm 21 shall be mounted a clasp cushion not shown), from which it can be seen that the bridge 9 has adapter elements 19, where each adapter element 19 has a connection element 13, which is intended for connection with a locking element 3 via the groove 20.

Figure 10A:
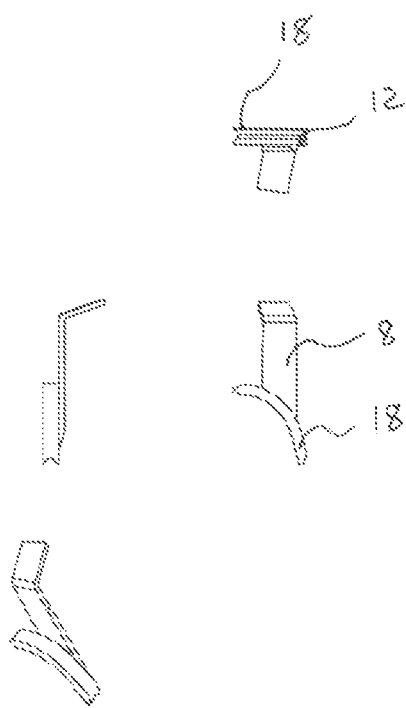
Figure 10B:
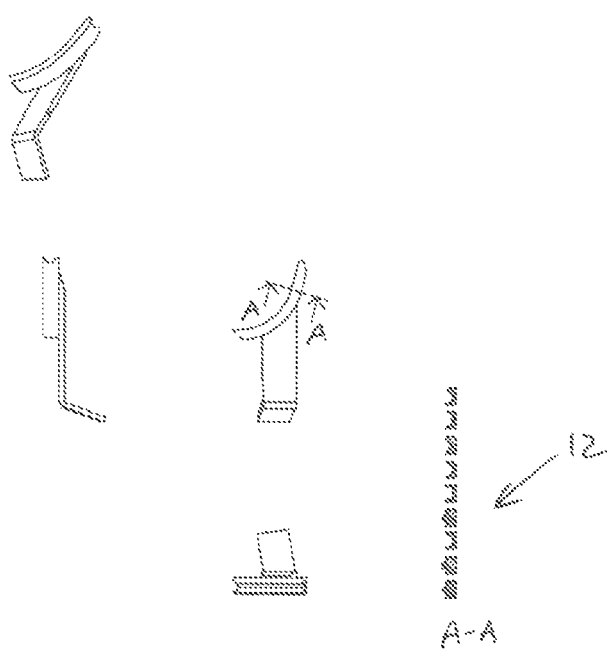

FIG. 10 shows in FIG. 10A-10B details of the hinge elements 8, where adapter element 18 and connection element 12 are shown. The longitudinal connection element 12, which when the adapter element 18 is mounted in a frame element 2, is essentially lying in the same plane as the edge of a put in place locking element 3, and where the connection element 12 is intended to interact with a locking element 3.

In FIG. 10B a cross section A-A shows different variants of a hinge element's connection elements 12. The shown variants are also possible for frame element 2 and nose bridge 9, where all the connection elements can be made in the form of depressions (grooves) or protrusions (tongues) intended to receive a locking element 3, which is adapted to the form in question for connection element.

The adapter elements 18 on the hinge elements 8 can also comprise another material on the side of the adapter elements 18, which are intended to face a locking element 3, meaning on the connection element 12.

FIG. 11 shows a separated eyeglass system 1, from which can be seen that both the frame element's second recess 14 intended for hinge element 8 and the frame element's second recess 15 intended for the nose bridge 9 are place on the back side 5 of the frame element 2.

FIG. 12 shows yet another separated eyeglass system 1, from which it can be seen that the frame element's second recess 14 intended for hinge element 8 is placed on the front side 4 of the frame element 2, while the frame element's second recess 15 intended for the nose bridge 9 is placed on the back side 5 of the frame element 2.

The FIGS. 13 to 15 show how a hinge element 8 and a nose bridge 9 are put together with a frame element 2. The figures show in essence that the adapter elements 19 on the nose bridge 9 and the adapter elements 18 on the hinge elements 8 are so adapted to the first recesses in the frame elements 2, that both adapter elements 19 on the nose bridge 9 and the adapter elements 18 on the hinge elements 8 have opposite pull forces and push forces in relation to the frame elements 2.

FIG. 13 shows in FIG. 13A-13B the attachment of the hinge elements 8 to the frame elements 2, from which it can be seen that the hinge elements 8 are pulled in the direction from the frame elements' inner side 7 out towards the frame elements' outer side 6, where the hinge elements 8 also correspond with the second recess 14 in the frame element 2, where the second recess 14 runs between the frame element's first recess 16 to the hinge element 8 and the frame element's outer side 6. When a hinge element 8 is mounted in a frame element's first recess 16, the hinge element's connection element 12 shall coincide with the frame element's connection element 11, and each hinge element 8 can thus be fixed to a frame element 2 by a locking element 3.

Figure 14A:
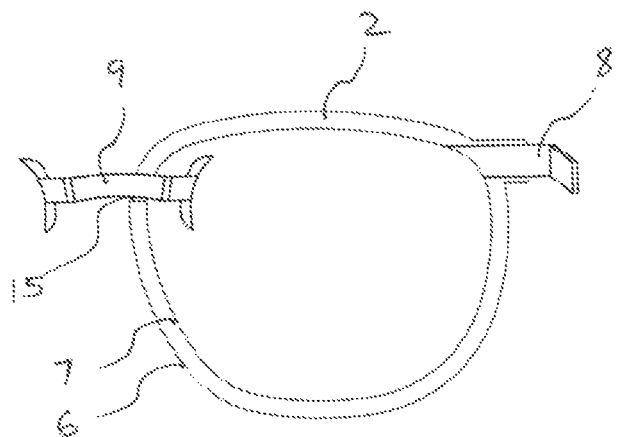
Figure 14B:
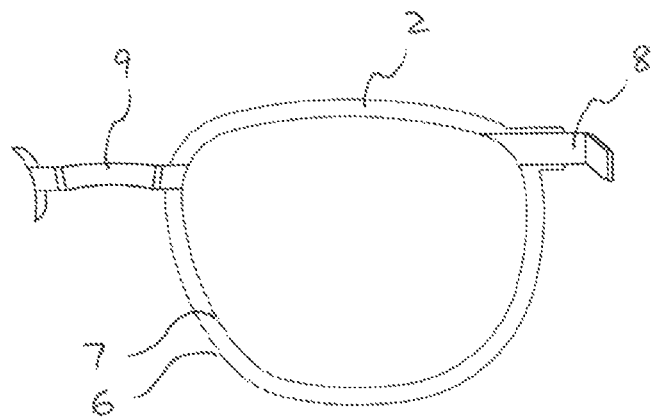

FIG. 14 shows in FIG. 14A-14B the attachment of a nose bridge 9 to a frame element 2, from which it can be seen that the nose bridge 9 is pulled in the direction from the frame element's inner side 7 out towards the frame elements outer side 6, where the nose bridge 9 also corresponds to the second recess 15 in the frame element 2, where the second recess 15 runs between the frame element's first recess 17 and the nose bridge 9 and the frame element's outer side 6. When a nose bridge 9 is mounted in a frame element's first recess 17, the nose bridge's connection element 13 will coincide with the frame element's connection element 11, and the nose bridge 9 can then be fixed to a frame element 2 by a locking element 3. In FIG. 14 a hinge element 8 is already mounted.

FIG. 15 shows in FIG. 15A-15B the attachment of a nose bridge 9 to another frame element 2, where the attachment is performed in the same way as described in FIG. 14. In FIG. 15 a hinge element 8 is already mounted in each in its frame element 2, where the nose bridge 9 in FIG. 15A is mounted in one of the frame elements 2, and where it in FIG. 15B is mounted on the other frame element 2.

FIG. 16 shows a variant of a frame element 2, where a part of the frame element's connection element 11 in this variant partly consists of a first recess 23 in the frame element 2 and partly of a locking device 24. The cross-section A-A shows how the first recess 23 is larger in the cross section in the middle of the frame element 2.

Figures 17A, 17B:
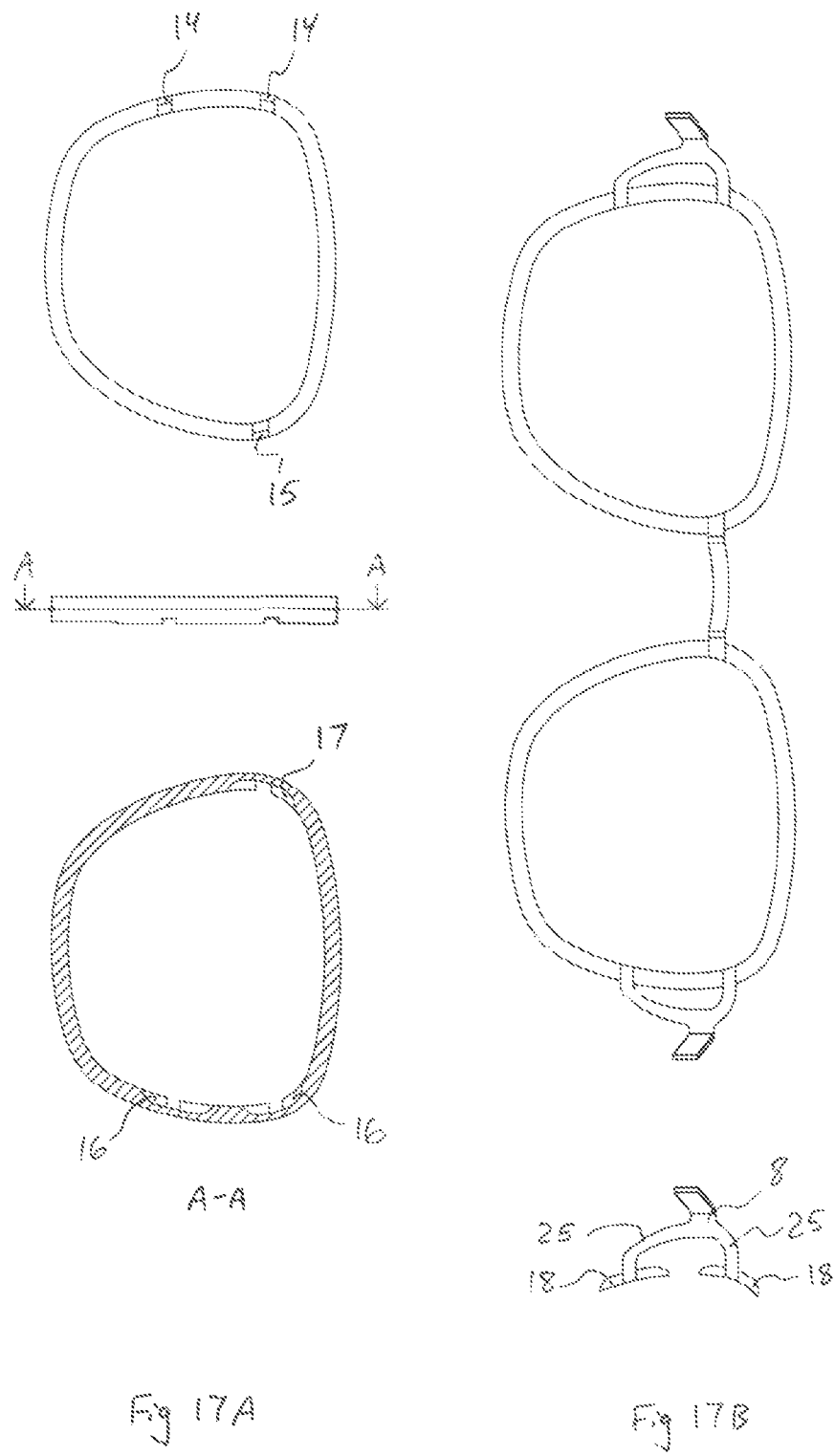

FIG. 17 shows in FIG. 17A-17B a variant of an eyeglass system 1, where the frame element 2 has several first recesses 16 for use for a hinge element 8 and also has several second recesses 14 for use for a hinge element 8. Additionally, the frame element 2 has a first recess 17 for a nose bridge 9 and a second recess 15 for use for a nose bridge 9.

The hinge element 8 as shown in FIG. 17B has two arms 25, where each arm 25 has an adapter element 18. Corresponding with the shown hinge element 8, a nose bridge 9 could also have more arms.

FIG. 18 shows in FIG. 18A-18B an additional variant of an eyeglass system 1, where the frame element 2 has a first recess 16 for use for a hinge element's adapter element 18 and has several second recesses 14 for use for the hinge element's arms 25. Additionally, the frame element 2 has a first recess 17 for a nose bridge 9 and a second recess 15 for use for a nose bridge 9. The hinge element 8 as shown in FIG. 18B has two arms 25, but only one adapter element 18.

FIG. 19 shows in FIG. 19A-19B yet an additional variant of an eyeglass system 1, where the frame element 2 has several first recesses 16 for use for a hinge element's adapter elements 18 and also has several second recesses 14 for use for the hinge element's arms 25. Additionally, the frame element 2 has a first recess 17 for a nose bridge 9. The hinge element 8 as shown in FIG. 19B has two arms 25, where each arm 25 has an adapter element 18.

The FIGS. 20 to 22 shows a variant of an eyeglass system 1 with a rod 26 (secondary eyeglass element), where each frame element 2 comprises at least one second recess 27 running on the frame element's front side 4 or back side 5, where the second recess 27 runs between the frame element's first recess 28 for the rod 26 and the frame element's outer side 6, where the second recess 27 is intended for receiving the rod 26.

FIG. 21 shows a frame element 2 for a rod 26, where the frame element's second recess 14 for the hinge element 8, the frame element's second recess 15 for the nose bridge 9 and the frame element's second recess 27 for the rod 26 are shown. All the second recesses are shown here on the frame element's back side 5.

FIG. 22 shows an additional variant of an eyeglass system 1 as noted in FIG. 20.

FIG. 23 shows details of the connection between a frame element 2, a hinge element 8 and a locking element 3 in the section A-A and details of the connection between a frame element 2 and a locking element 3 in the sections B-B, while the section C-C shows second recess 14 and first recess 16 in the frame element 2.

Section A-A shows details of the connection between a frame element 2, a hinge element 8 and a locking element 3, where the hinge element 8 via a second recess 14 and a first recess 16 is connected to the frame element 2, and where the hinge element's connection element 12 is connected to the locking element 3. Section A-A could in principle also be details of the connection between a frame element 2, a nose bridge 9 and a locking element 3.

The sections B-B show on top five different embodiments for connection elements 11 in the frame element 2 and below two additional different embodiments of the connection elements 11 in the frame element 2, where additionally a spring element 29 is provided. In the more highly placed of the two examples a spring element 29 is seen as being circular and for example made of rubber, and in the lower of the two examples a spring element 29 is seen as a spring.

Section C-C shows the second recess 14 and the first recess 16 in the frame element 2, provided for the hinge element's adapter element 18.

FIG. 24 shows details of the connection between a frame element 2, a hinge element 8 and a locking element 3 in section A-A and details of the connection between a frame element 2 and a locking element 3 in the sections B-B, while section C-C shows a hole 30 and first recess 16 in the frame element 2.

Section A-A shows details of the connection between a frame element 2, a hinge element 8 and a locking element 3, where the hinge element 8 via a hole 30 with rectangular cross section in the frame element 2 and a first recess 16 is connected to the frame element 2, and where the frame element's connection element 12 is connected to the locking 3.

The sections B-B show at the top five different embodiments of connection elements 11 in the frame element 2 and below two additional different embodiments of the connection element 11 in the frame element 2, where, in addition, a spring element 29 is provided. In the upper of the two examples a spring element 29 is seen as being circular and for example made of rubber, and in the lower of the two examples is seen a spring element 29 as a spring.

Section C-C shows the hole 30 and the first recess 16 in the frame element 2 provided to the hinge element's adapter element 18.

The invention is not limited to the above described embodiments that serve only the goal to make clear preferred embodiments of the invention.

The invention claimed is:

1. A self-locking eyeglass system (1), comprising at least one locking element (3) at least one frame element (2), wherein the at least one frame element (2) comprises a front side (4), a back side (5), an outer side (6) with an external circumference and an inner side (7) with an internal circumference, wherein the at least one frame element (2) additionally comprises a connection element (11), which is intended for connection to a locking element (3), wherein the at least one frame element (2) is unbroken in its external circumference, and where the connection element (11) is provided on the inner side (7), wherein the self-locking eyeglass system (1) additionally comprises two hinge elements (8) and two temple bars, wherein the at least one frame element (2) is connected via the hinge elements (8) to the temple bars, wherein each hinge element (8) has a connection element (12), which coincides with the frame element's connection element (11), when the hinge elements (8) are mounted in the at least one frame element, and wherein each hinge element (8) is secured to the at least one frame element (2) by a locking element (3), characterized in that each hinge element (8) comprises an adapter element (18), which is complementary to at least one first recess (16) in the at least one frame element (2), that the at least one first recess (16), is provided from the inner side (7) in the direction towards the outer side (6), and that the hinge elements (8) are mounted in the at least one frame element's first recess (16) and that the at least one frame element (2) additionally comprises at least one second recess (14) extending on at least one of the frame element's front side (4) and back side (5), wherein the second recess (14) extends between the frame element's at least one first recess (16) and the frame element's outer side (6), wherein the second recess (14) is intended to accommodate the hinge element.

2. The self-locking eyeglass system (1) according to claim 1, characterized in that the eyeglass system (1) comprises an additional locking element (3).

3. The self-locking eyeglass system (1) according to claim 1, characterized in that the eyeglass system (1) comprises an additional frame element (2) and a nose bridge (9), wherein the nose bridge (9) connects the frame elements (2), and wherein the nose bridge (9) comprises adapter elements (19), which match at least one first recess (17) in each of the frame elements (2), wherein each adapter element (19) has a connection element (13), which coincides with the frame element's connection element (11), when the nose bridge's adapter element (19) is mounted in a frame element's first recess (17), and wherein the nose bridge's adapter elements (19) are secured to each its own frame element (2) by a locking element (3).

4. The self-locking eyeglass system (1) according to claim 1, characterized in that the at least one frame element (2), and the hinge element (8) have connection elements (11,12), which are intended for connection by a locking element (3).

5. The self-locking eyeglass system (1) according to claim 3, characterized in that each frame element (2) additionally comprises at least one further second recess (15) extending on at least one of the frame element's front side (4) and back side (5), wherein the further second recess (15) extends between the frame element's at least one first recess (17) and the frame element's outer side (6), wherein the further second recess (15) is intended to accommodate the nose bridge (9).

6. The self-locking eyeglass system (1) according to claim 1, characterized in that each frame element (2) additionally comprises at least one further second recess (27) which extends on the at least one of the frame element's front side (4) and back side (5), wherein the further second recess (27) extends between a frame element's at least one first recess (28) and the frame element's outer side (6), wherein the further second recess (27) is intended to accommodate a secondary eyeglass element (26).

7. The Self-locking eyeglass system (1) according to claim 1, characterized in that at least one of the adapter elements (18) on the hinge elements (8) comprise a longitudinal connection element (13,12), which when the adapter element (18) is mounted in the frame element (2) is essentially located in the same plane as the edge of an inserted locking element (3), and wherein the connection element (13,12) is precisely intended to interact with the locking element (3).

8. The self-locking eyeglass system (1) according to claim 1, characterized in that at least one of the adapter elements (18) on the hinge elements (8) comprises another material on the side of the connection element (12) that is intended to face a locking element (3).

9. The self-locking eyeglass system (1) according to claim 3, characterized in that the adapter elements (18) on the hinge elements (8) are thus adapted to the first recesses (17,16) in the frame elements (2), in that both of the adapter elements (18) on the hinge elements (8) have opposite pulling forces and pushing forces in relation to the frame elements (2).

10. The self-locking eyeglass system (1) according to claim 1, characterized in that the eyeglass system (1) additionally comprises at least one clasp with a respective clasp arm (21) and clasp cushion, where the clasp is placed on one of the at least one frame element (2).

11. The self-locking eyeglass system (1) according to claim 1, characterized in that the frame elements (2) are made from materials with elastic properties.

12. The self-locking eyeglass system (1) according to claim 1, characterized in that the self-locking eyeglass system (1) additionally comprises a spring element (29) between the at least one connection element (11,12) and a frame element (2).

13. The self-locking eyeglass system (1) according to claim 3, characterized in that the frame element (2), the hinge element (8) and the nose bridge (9) have connection elements (11,12,13), which are intended for connection by the locking element (3).

14. The self-locking eyeglass system (1) according to claim 3, characterized in that at least one of the adapter elements (18) on the hinge elements (8) and the adapter elements (19) on the nose bridge (9) comprise a longitudinal connection element (13,12), which when the adapter element (18,19) is mounted in the frame element (2) is essentially located in the same plane as the edge of an inserted locking element (3), and wherein the connection element (13,12) is precisely intended to interact with the locking element (3).

15. The self-locking eyeglass system (1) according to claim 3, characterized in that at least one of the adapter elements (18) on the hinge elements (8) and the adapter elements (19) on the nose bridge (9) comprises another material on the side of the connection elements (13,12) that is intended to face the locking element (3).

16. The self-locking eyeglass system (1) according to claim 3, characterized in that the adapter elements (18) on the hinge elements (8) and the adapter elements (19) on the nose bridge (9) are thus adapted to the first recesses (17,16) in the frame elements (2), in that both of the adapter elements (18) on the hinge elements (8) and the adapter elements (19) on the nose bridge (9) have opposite pulling forces and pushing forces in relation to the frame elements (2).

17. The self-locking eyeglass system (1) according to claim 3, characterized in that the eyeglass system (1) additionally comprises at least one clasp with a respective clasp arm (21) and clasp cushion, where the clasp is placed on one of the at least one frame element (2) and the nose bridge (9).

18. The self-locking eyeglass system (1) according to claim 3, characterized in that the self-locking eyeglass system (1) additionally comprises a spring element (29) between the at least one connection element (11,12,13) and a frame element (2).

* * * * *